June 11, 1957　　　O. SAXLUND　　　2,795,358
SILOS
Filed Jan. 12, 1955

INVENTOR
ODDMUND SAXLUND
BY Wenderoth, Lind + Ponack
Attys.

2,795,358

SILOS

Oddmund Saxlund, Arendal, Norway

Application January 12, 1955, Serial No. 481,457

2 Claims. (Cl. 222—227)

The present invention relates to an arrangement in silos for granular or powder-formed materials, such as saw dust or the like. The object of the invention is to provide a mechanically driven device adapted to ensure a discharge of the material from the silo, e. g. through a suitable sluicing or discharge device at the bottom of the silo.

In connection with silos, e. g. silos for storage of saw dust, difficulties have always arisen in connection with emptying of the silo at the bottom thereof by means of a usual discharge device because the saw dust has a tendency to agglomerate and remain in the silo.

The invention provides a suitable device which upon operation of the discharge arrangement will at any time take care that the material in the silo is maintained in movement and will be fed towards the discharge sluice.

The invention consists in an improvement in silos for granular or powder-formed material, such as saw dust or the like, adapted to ensure discharge of the material through a suitable sluicing or discharge device at the bottom of the silo, and comprising a stirring device having a driving shaft extending in the axial direction of the silo, and the invention is characterized thereby that this shaft has attached thereto resilient leaves extending towards the walls of the silo, which leaves have such a degree of resiliency that when the silo is entirely filled with material the leaves may wind spirally around said shaft.

In a preferred embodiment of the invention relatively small drums are attached to the shaft at suitable distances thereon, said leaf springs being attached to said drums.

Below the invention is explained with reference to the drawing, which by way of example illustrates an embodiment.

Figure 1:
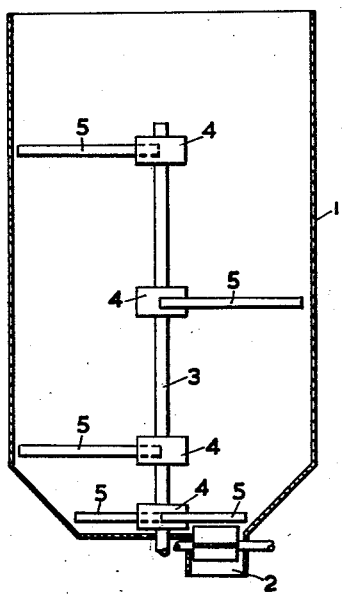
Fig. 1 shows a vertical section taken through the silo.
Figure 2:
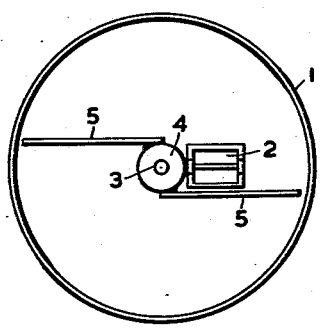
Fig. 2 is a top view of the silo.

On the drawing numeral 1 designates the silo proper, which is shown as having a cylindrical cross section, but also may have polygonal cross section. Numeral 2 designates a suitable sluicing or discharge device placed adjacent to the bottom of the silo and adapted to discharge material contained in the silo. A shaft 3, extending in the axial direction of the silo, is adapted to be rotated by means of a suitable driving device (not shown). On said shaft are placed, at suitable intervals, small drums 4 having attached thereto arms in the form of leaf springs 5, the lengths of which are so chosen that when straightened out said leaves extend substantially to the walls of the silo.

When the silo is filled with material and the shaft is rotated, the spring leaves 5 trail against the material and thereby wind themselves spirally around the drums 4. As material is removed from the silo, the arms 5, due to their resiliency, will try to straighten themselves and accordingly they will contact the inner surface of the material and thus will work loose the latter, so that said material will sink towards the bottom of the silo, from where the material is removed by means of the discharge device 2.

I claim:

1. In a silo having a discharge opening in the bottom thereof, means to loosen stored silage and insure discharge thereof comprising a shaft rotatably mounted axially of the silo, a number of drums having a diameter greater than the diameter of said shaft and mounted at spaced intervals on said shaft, and a number of flexible leaf springs, one attached to the periphery of each drum and extending substantially radially of the shaft when the spring is in the unbent condition and adapted to be wound spirally around said shaft when said shaft is rotated in the silo when the silo is full of silage.

2. Means as claimed in claim 1 in which each leaf spring is attached to one of said drums so that it extends tangentially thereof.

References Cited in the file of this patent

UNITED STATES PATENTS

| | | |
|---|---|---|
| 928,949 | Deppe | July 27, 1909 |
| 1,291,759 | Bunnell | Jan. 21, 1919 |
| 2,228,421 | Taylor | Jan. 14, 1941 |
| 2,532,238 | Malke | Nov. 28, 1950 |
| 2,561,258 | Wolf et al. | July 17, 1951 |